United States Patent
Isami et al.

(10) Patent No.: US 8,730,428 B2
(45) Date of Patent: May 20, 2014

(54) LIQUID CRYSTAL DISPLAY DEVICE HAVING FIRST AND SECOND CONDUCTIVE MEMBERS

(75) Inventors: Hironobu Isami, Chiba (JP); Akio Tezuka, Mobara (JP); Fumiyuki Sato, Kamogawa (JP)

(73) Assignees: Japan Display Inc., Tokyo (JP); Panasonic Liquid Crystal Display Co., Ltd., Hyogo-ken (JP)

(*) Notice: Subject to any disclaimer, the term of this patent is extended or adjusted under 35 U.S.C. 154(b) by 322 days.

(21) Appl. No.: 13/025,318

(22) Filed: Feb. 11, 2011

(65) Prior Publication Data

US 2011/0199554 A1  Aug. 18, 2011

(30) Foreign Application Priority Data

Feb. 15, 2010 (JP) ................................ 2010-030231

(51) Int. Cl.
 G02F 1/1333 (2006.01)
 G02F 1/1345 (2006.01)
 F21V 7/04 (2006.01)

(52) U.S. Cl.
 USPC ............ 349/59; 349/40; 349/54; 349/58; 349/150; 362/630; 362/633; 362/634

(58) Field of Classification Search
 USPC ............ 349/40, 54, 58–60, 65, 149, 150; 362/630, 632–634
 See application file for complete search history.

(56) References Cited

U.S. PATENT DOCUMENTS

| 6,525,786 | B1 | 2/2003 | Ono | |
| 6,971,780 | B2* | 12/2005 | Lee et al. | 362/561 |
| 7,911,555 | B2 | 3/2011 | Fukayama et al. | |
| 2007/0070263 | A1* | 3/2007 | Nishimura et al. | 349/58 |
| 2009/0310055 | A1* | 12/2009 | Kim et al. | 349/58 |

FOREIGN PATENT DOCUMENTS

| JP | 2001-147441 | 5/2001 |
| JP | 2003-302622 | 10/2003 |
| JP | 2004-127912 | 4/2004 |
| JP | 2005-55512 | 3/2005 |
| JP | 2006-330230 | 12/2006 |
| JP | 2008-102173 | 5/2008 |
| JP | 2008-209468 | 9/2008 |
| JP | 2009-36893 | 2/2009 |

* cited by examiner

*Primary Examiner* — Lucy Chien
*Assistant Examiner* — Paisley L Arendt
(74) *Attorney, Agent, or Firm* — Antonelli, Terry, Stout & Kraus, LLP.

(57) ABSTRACT

This invention provides a liquid crystal display device that makes it possible to ground the conductive film provided on the display side of the liquid crystal display panel without fail while making the frame narrower. The device has a liquid crystal display panel where a liquid crystal layer is provided between two facing substrates; a mold frame for holding the liquid crystal display panel in a predetermined position; a lower frame made of a metal for containing the mold frame; and first and second conductive members, and characterized in that a conductive film is formed on the display side of the liquid crystal display panel, the first conductive member is provided so as to make contact with the conductive film and an upper surface of the mold frame, and the second conductive member is provided so as to make contact with the first conductive member and the lower frame.

8 Claims, 4 Drawing Sheets

DRAWINGS

LIQUID CRYSTAL DISPLAY DEVICE HAVING FIRST AND SECOND CONDUCTIVE MEMBERS

CROSS-REFERENCE TO RELATED APPLICATIONS

The present applications claims priority over Japanese Application JP2010-030231 filed on Feb. 15, 2010, the contents of which are hereby incorporated into this application by reference.

BACKGROUND OF THE INVENTION (1) Field of the Invention

The present invention relates to a liquid crystal display device, and in particular to a liquid crystal display device having a conductive film on the display side of the liquid crystal display panel.

(2) Description of the Related Art

Liquid crystal display devices are used as display devices for many electronics, such as monitors, cellular phones and portable information terminals. In liquid crystal display devices, a liquid crystal layer is sandwiched between two facing transparent substrates. Electrodes for applying an electrical field to the liquid crystal layer corresponding to the pixels and wires for driving the electrodes are formed on one of the facing transparent substrates and color filters are formed on the other transparent substrate.

In liquid crystal display devices where no electrodes are formed on the transparent substrate on the color filter side, such as in-plane switching (IPS) liquid crystal display devices, a transparent conductive film, such as of ITO, is formed on the rear of the transparent substrate (the surface of the liquid crystal display panel on the display side), so that the transparent conductive film is electrically grounded, in order to prevent the transparent substrate on the color filter side from being charged and generating an unnecessary electrical field. In addition, the polarizing plate that is pasted to the transparent substrate may be conductive, as in JP2006-330230A. When a transparent substrate is charged and an unnecessary electrical field is applied to the liquid crystal layer, a problem may arise, such that some of the pixels do not display the correct color, or the entire screen turns up whitish, and thus the display does not function normally.

FIG. 1 is a plan diagram showing a liquid crystal display device as viewed from the front, and FIG. 2 is a cross sectional diagram along the line A-A' in FIG. 1. As shown in FIG. 2, the liquid crystal display device has a liquid crystal display panel LCP where a liquid crystal layer is sandwiched between two facing transparent substrates that are held in a predetermined position by a mold frame MFR made of a resin. The mold frame MFR is contained in a lower frame SFR, and a backlight, not shown, is provided between the liquid crystal display panel LCP and the lower frame SFR.

An upper frame UFR is provided around the periphery of the liquid crystal display panel LCP. The upper frame UFR is provided so as to cover the lower frame SFR and secured to the lower frame SFR by means of a fixing means, such as screws.

The lower frame SFR and the upper frame UFR are usually formed of a metal, such as steel. In order to ground the conductive film (transparent conductive film or conductive polarizing plate) formed on the liquid crystal display panel on the display side, as described above, a conductive rubber CG may connect the conductive film of the liquid crystal display panel LCP and the mold frame MFR as shown in FIG. 2. In addition, the conductive rubber CG is made to make contact with the upper frame UFR, and furthermore the upper frame UFR and the lower frame SFR are combined, so that the conductive film is electrically grounded to the lower frame.

The conductive rubber CG is thicker than the clearance between the mold frame MFR and the upper frame UFR. In addition, as shown in FIG. 3, when the upper frame UFR is screwed to the lower frame SFR at the point B, the upper frame is pushed in the direction of the arrow, and as a result part of the upper frame UFR on the display side becomes easy to lift in the direction of the arrow C.

Therefore the electrical contact between the conductive rubber CG and the upper frame UFR becomes insufficient, causing the surface of the liquid crystal display panel to become charged and causing defects in the display. In addition, in the case where the upper frame UFR is made of aluminum in order to reduce the weight of the liquid crystal display device, the upper frame UFR lifts more. In addition, when the surface of aluminum is oxidized, sufficient electrical connection with the conductive rubber becomes more difficult to secure.

In addition, JP2006-330230A discloses a technology for releasing a charge in the panel by pasting a conductive sheet to the corner portion of the panel with the sheet extending to the lower frame, and thus grounding the conductive polarizing plate provided on the liquid crystal display panel. However, the conductive sheet can be pasted only in the corner portion, where supports for the liquid crystal display panel are provided so that the cell can be secured, and therefore there is much less freedom of design, for example for the form of the mold frame and the arrangement of the conductive sheet. In addition, the supports of the liquid crystal display panel being lower than the upper surface of the conductive sheet that is pasted on the panel easily causes the brightness to be inconsistent, and therefore setting of the clearance between the mold frame and the upper frame becomes very difficult.

In the case where the conduction from the conductive film to the lower frame in the liquid crystal display panel is secured only with conductive rubber, it is necessary for the clearance between the upper frame and the lower frame to secure a certain thickness for the conductive rubber, and therefore it becomes difficult to make the frame of the liquid crystal display device narrower. In addition, there is a risk that the conductive rubber may be compressed or become disconnected when the mold frame and the lower frame are covered with the upper frame.

SUMMARY OF THE INVENTION

An object of the present invention is to solve the above described problems and provide a liquid crystal display device that makes it possible to ground the conductive film provided on the display side of the liquid crystal display panel without fail while making the frame narrower.

In order to achieve the above described object, the display device according to the present invention has the following features:

(1) A liquid crystal display device having: a liquid crystal display panel where a liquid crystal layer is provided between two facing substrates; a mold frame for holding the above described liquid crystal display panel in a predetermined position; a lower frame made of a metal for containing the above described mold frame; and first and second conductive members, characterized in that a conductive film is formed on a display side of the above described liquid crystal display panel, the above described first conductive member is provided so as to make contact with the above described conductive film and an upper surface of the above described mold frame, and the above described second conductive member is provided so as to make contact with the above described first conductive member and the above described lower frame.

(2) The liquid crystal display device according to (1), characterized by further comprising an upper frame made of a metal for covering the area around the above described liquid crystal display panel while exposing the display portion, characterized in that the above described upper frame makes contact with the above described first conductive member.

(3) The liquid crystal display device according to (1) or (2), characterized in that the above described first conductive member is a conductive rubber.

(4) The liquid crystal display device according to any of (1) to (3), characterized in that the above described second conductive member is a tape made of a metal.

(5) The liquid crystal display device according to any of (2) to (4), characterized in that the above described first conductive member has a first surface that makes contact with the above described second conductive member and a second surface on the side opposite to the above described first surface, and the above described second surface makes contact with the above described upper frame.

(6) The liquid crystal display device according to any of (2) to (4), characterized in that the above described first conductive member has a first surface that makes contact with the above described second conductive member and a second surface on the side opposite to the above described first surface, and the above described second surface makes contact with the above described upper frame through a third conductive member.

(7) The liquid crystal display device according to any of (2) to (6), characterized in that the above described upper frame is formed of a metal of which the main component is aluminum.

(8) The liquid crystal display device according to any of (1) to (7), characterized in that the above described second conductive member is thinner than the above described first conductive member.

The liquid crystal display device according to the present invention has a first conductive member (conductive rubber) provided over the conductive film and the upper surface of the mold frame, and a second conductive member (conductive sheet or tape made of a metal) provided over part of the mold frame on which the conductive rubber is provided and the lower frame, and therefore the conductive film can be grounded without fail, without using the conductivity of the upper frame. In addition, a conductive sheet is simply pasted to the mold frame and the side of the lower frame, and therefore it is also possible to make the frame of the liquid crystal display device narrower.

In addition, the liquid crystal display device according to the present invention has an upper frame which covers the area around the liquid crystal display panel, and engages with and is secured to a lower frame in such a manner that the conductive rubber is pressed against the conductive sheet, and therefore the conductive rubber and conductive sheet can be electrically connected without fail when pressed by the upper frame.

In addition, in the liquid crystal display device according to the present invention, the upper frame is made of a metal, and a third conductive member (conductive sheet) is pasted to the portion of the upper frame which makes contact with the conductive rubber, and therefore, even when the surface of the upper frame is oxidized, the electrical connection between the upper frame and the conductive rubber can be secured by means of the conductive sheet without fail, in order to electrically ground the upper frame.

Particularly in the case where the upper frame is made of aluminum in the liquid crystal display device according to the present invention, the conductive film on the liquid crystal display panel can be grounded without fail, even when there is a problem, such as the upper frame lifting when secured to the lower frame or the surface of the upper frame being oxidized.

Furthermore, in the liquid crystal display device according to the present invention, the second conductive member (conductive sheet) is thinner than the first conductive member (conductive rubber), the upper frame can be grounded by means of a conductive sheet when the clearance between the upper frame and the mold frame is not greatly different from in the prior art, and even when the conductive sheet is provided on the side of the mold frame or the lower frame, it does not prevent the frame of the liquid crystal display device from becoming narrower.

In addition, conduction can be secured without fail, as described above, and therefore the conductive film can be sufficiently grounded, even when the conductive rubber is smaller than in the prior art, or the number of conductive rubbers is smaller. Therefore, it is also possible to reduce the cost for manufacture.

DESCRIPTION OF THE EMBODIMENTS

Figure 1:
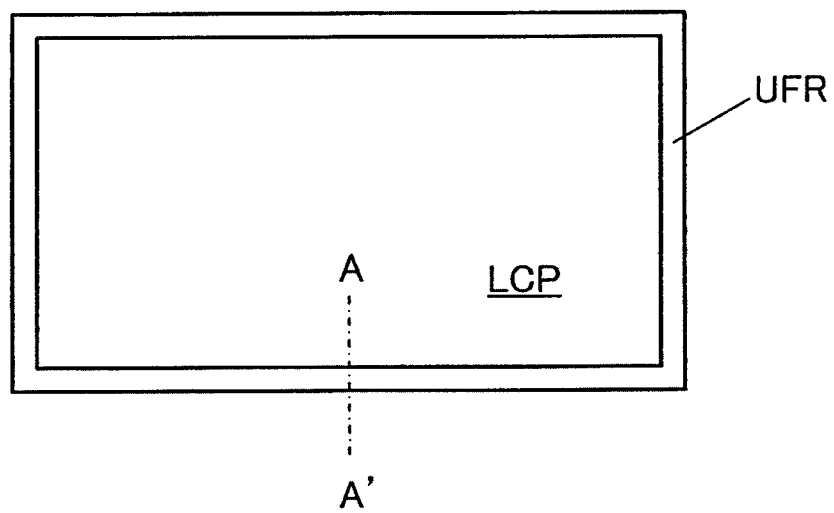
FIG. 1 is a plan diagram showing a liquid crystal display device as viewed from the display side.
Figure 2:
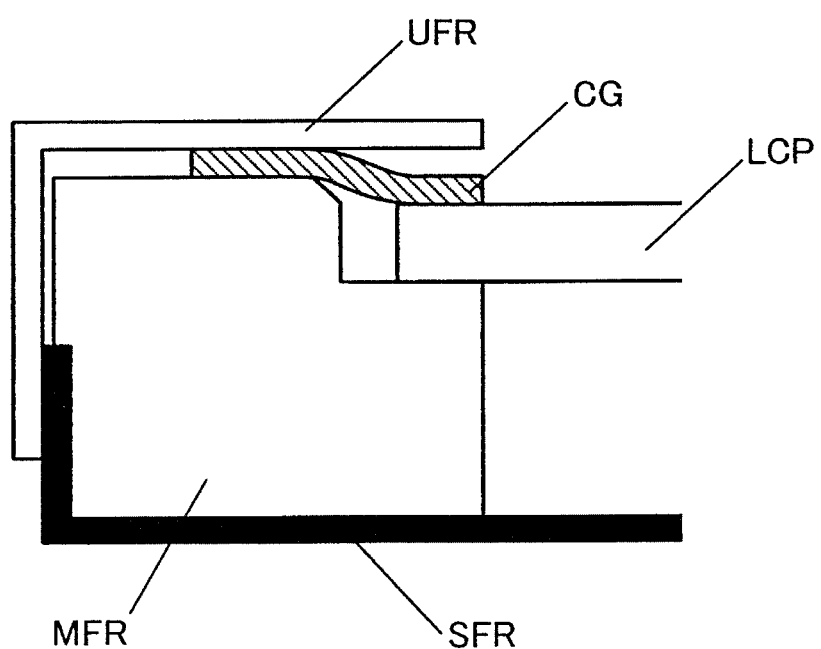
FIG. 2 is a cross sectional diagram along the line A-A' in FIG. 1 showing part of the structure of a conventional liquid crystal display device.
Figure 3:
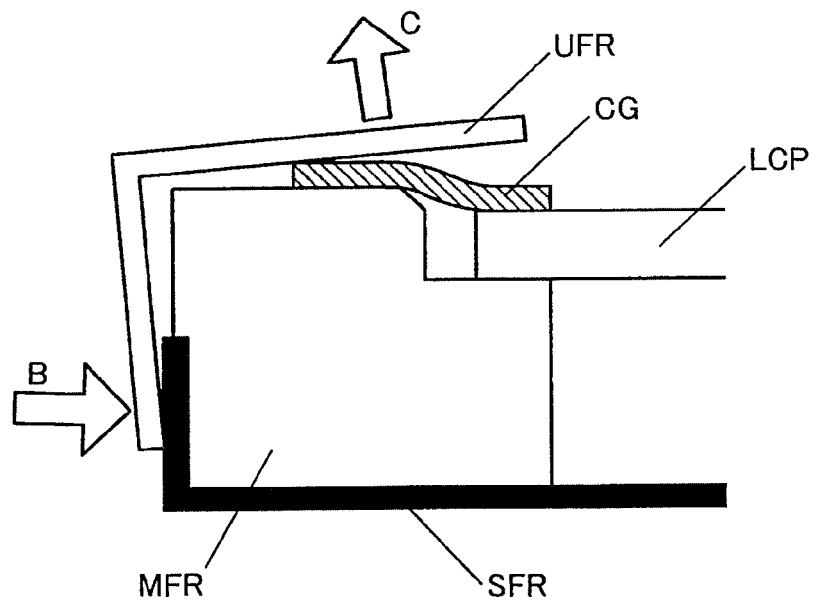
FIG. 3 is a cross sectional diagram illustrating a problem with the conventional liquid crystal display device in FIG. 2.
Figure 4:
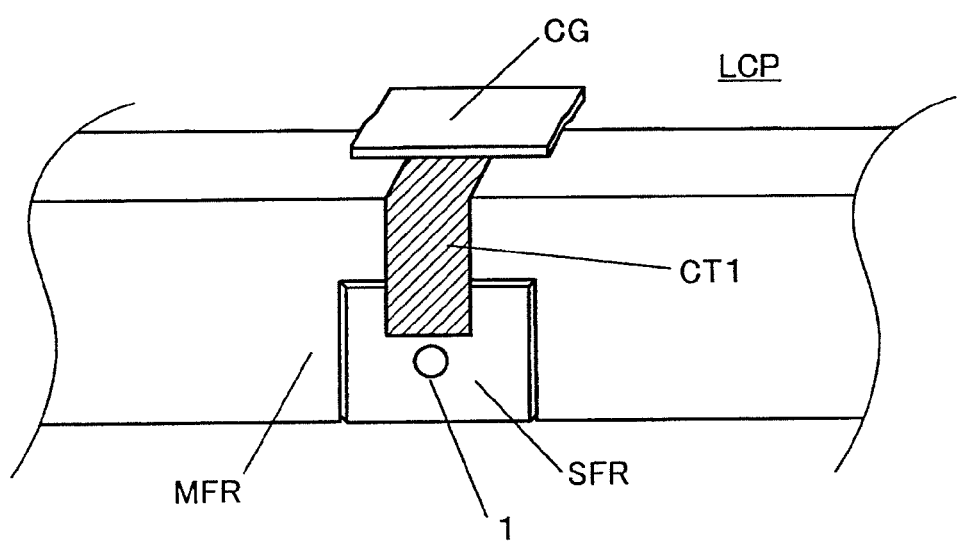
FIG. 4 is a perspective diagram showing part of the liquid crystal display device according to the present invention.

The liquid crystal display device according to the present invention is described in detail below. FIG. 4 is a perspective diagram showing part of the liquid crystal display device according to the present invention. In FIG. 4 onward, the same symbols are used as in FIGS. 1 to 3 for members that are the same.

The liquid crystal display device according to the present invention has a liquid crystal display panel LCP where a liquid crystal layer is provided between two facing transparent substrates, a mold frame MFR made of a resin for holding the liquid crystal display panel in a predetermined position, and a lower frame SFR made of a metal for containing the mold frame, and is characterized by having a conductive rubber CG (first conductive member) that is provided over a conductive film formed on the display side of the liquid crystal display panel LCP and the upper surface of the mold frame in order to electrically connect the conductive film to the lower frame SFR and a conductive sheet CT1 (second conductive member or tape made of a metal) that is provided over part of the mold frame on which the conductive rubber is provided and the lower frame.

The conductive film in the present invention is a member provided on the display side of the liquid crystal display panel so as to ground the liquid crystal display panel and prevent the surface of the liquid crystal display panel being charged, and not limited to a transparent conductive film such as of ITO, and may be a conductive polarizing plate as that disclosed in JP2006-330230A.

In addition, the conductive sheet of the present invention is not particularly limited, as long as it is basically thin and conductive as conductive rubber and can be pasted to the mold frame and the lower frame. For example, conductive, woven cloth with fine metal wires, metal tape and metal sheets are appropriate for use.

Liquid crystal display devices to which the present invention can be applied are described below. In the liquid crystal display panel, a liquid crystal layer LC is provided between two facing, transparent substrates. Pixel electrodes and common electrodes for applying an electrical field to the liquid crystal are formed on one transparent substrate, and in addition, thin film transistors, which are switching elements for driving the electrodes, are formed. Furthermore, wires for supplying power to the electrodes and switching elements are formed in a matrix on the transparent substrate, and some of the wires lead out from the transparent substrate.

Color filters are formed so as to correspond to the respective display pixels on the other transparent substrate. A transparent conductive film, such as of ITO, is formed on the display side of the transparent substrate (on the surface opposite to the liquid crystal layer side) so that the transparent substrate can be prevented from being charged. Furthermore, polarizing plates are provided outside the facing transparent substrates, and thus a liquid crystal display panel is formed. As described above, it is possible for the polarizing plates to be conductive instead of providing a transparent conductive film.

A light source, such as of light emitting diodes, is provided on the rear of the liquid crystal display panel as a backlight, and furthermore and optical sheet formed of a diffusion sheet or a prism sheet is provided between the backlight and the liquid crystal display panel in order to irradiate the entire surface of the liquid crystal display panel uniformly with light from the backlight.

Figure 5:
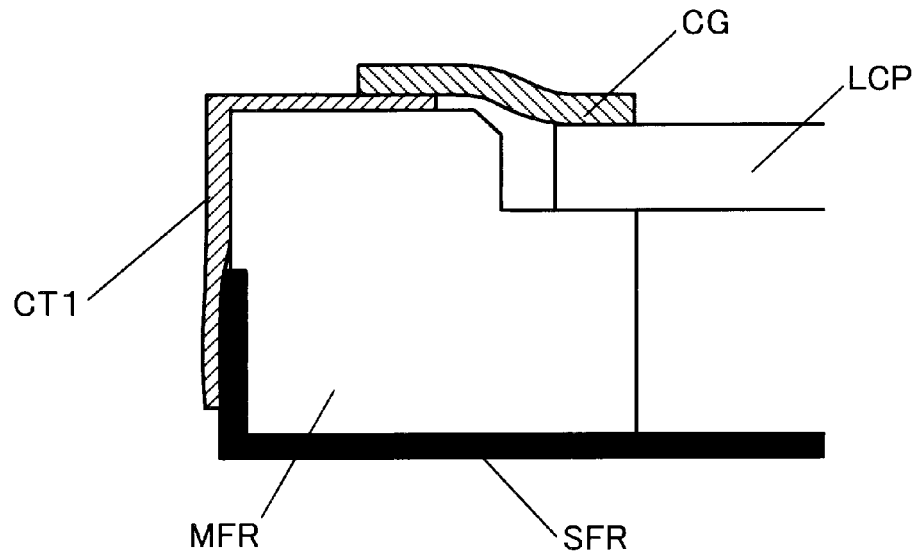
FIG. 5 is a cross sectional diagram showing part of the liquid crystal display device in FIG. 4.

As shown in FIG. 5, the liquid crystal display panel LCP, the backlight (not shown) and the like are positioned by the mold frame MFR made of a resin, and furthermore contained in the lower frame SFR made of a metal. In addition, as shown in FIG. 6, an upper frame UFR made of a metal for covering the area around the liquid crystal display panel while exposing the display portion is provided on the upper side of the liquid crystal display panel LCP if necessary.

The present invention is characterized in that the conductive film formed on the display surface of the liquid crystal display panel is grounded without fail and the liquid crystal display panel is held by a mold frame MFR made of a resin in a predetermined location. Therefore, as shown in FIGS. 4 and 5, a conductive sheet CT1 is pasted over the upper surface of the mold frame MFR and the lower frame SFR made of a metal, and the conductive sheet and the conductive film of the liquid crystal display panel are connected with the conductive rubber CG. That is to say, the conductive sheet CT1 is provided so as to make contact with the conductive rubber CG and the lower frame SFR.

According to the present invention, the conductive sheet CT1 is not directly connected to the liquid crystal display panel LCP, and therefore the liquid crystal display panel and backlight can be easily replaced in the case where they are defective. This is because the conductive rubber CG is easier to peel from the liquid crystal display panel LCP than the conductive sheet CT1. In addition, the conductive sheet makes contact with the conductive rubber on top of the mold frame MFR, and therefore it is possible to prevent extra stress from being applied to the liquid crystal display panel, so that problems with inconsistent brightness can be prevented.

Figure 6:
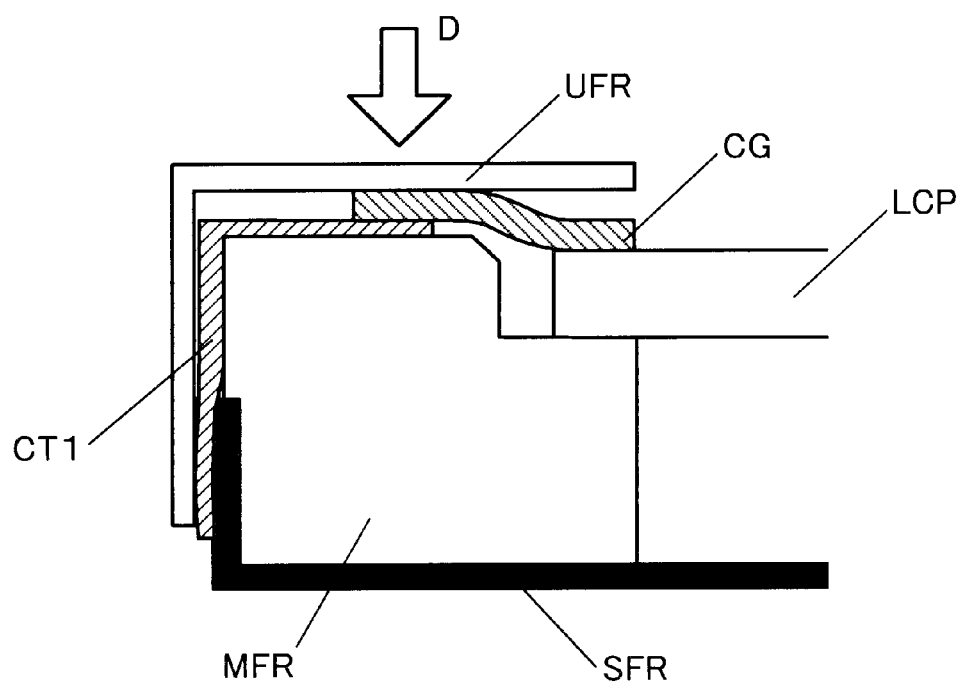
FIG. 6 is a cross sectional diagram showing how an upper frame is provided in the liquid crystal display device in FIG. 4.

FIG. 6 shows how the upper frame UFR is provided over the liquid crystal display device in FIG. 5. When the upper frame UFR is fixed, it is pressed in the direction of the arrow D, and therefore the conductive rubber CG is electrically connected to the conductive sheet CT1 without fail. In addition, when the upper frame is made of a conductive material, such as a metal, it is also possible to ground not only the conductive sheet but also the conductive rubber CG through the upper frame. That is to say, the conductive rubber CG has a first surface that makes contact with the conductive sheet CT1 and a second surface on the side opposite to the first surface. The second surface makes contact with the upper frame UFR. Here, the upper frame can be made of aluminum or an alloy of which the main component is aluminum, for example. The upper frame can be screwed too the lower frame through a hole 1 in the lower frame SFR, as in FIG. 4, and the hole 2 in the upper frame UFR, as in FIG. 7.

The conductive film formed on the display side of the liquid crystal display panel can be grounded without fail, and therefore the area of the conductive rubbers can be reduced, and the number of conductive rubbers can be reduced, and thus the number of parts and cost for manufacture can be reduced. In addition, the upper frame UFR may make contact with the conductive rubber CG as long as the clearance between the upper frame UFR and the mold frame is appropriate, which makes designing of the frames easy.

Figure 7:
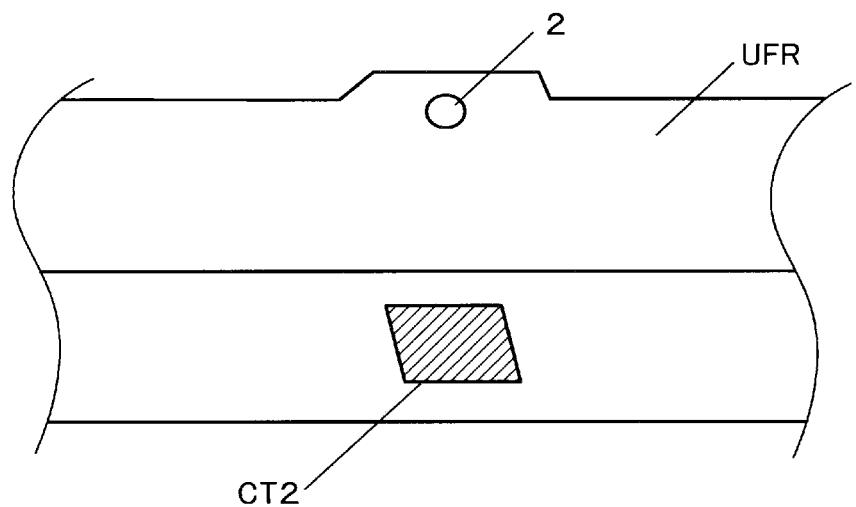
FIG. 7 is a perspective diagram showing part of the upper frame used in the liquid crystal display device according to the present invention.
Figure 8:
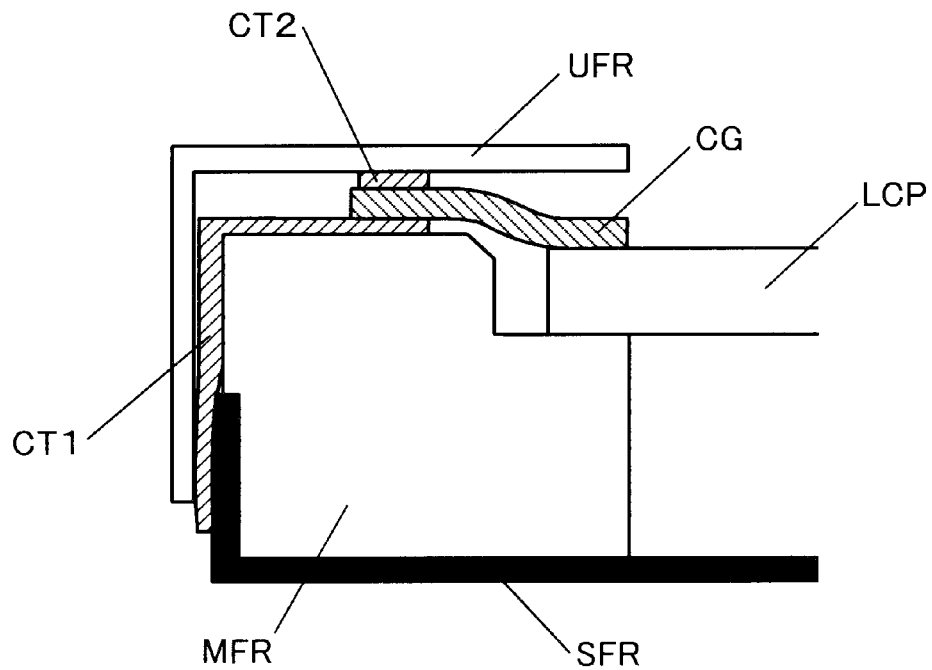
FIG. 8 is a cross sectional diagram showing part of the liquid crystal display device according to the present invention using the upper frame in FIG. 7.

Furthermore, as shown in FIG. 7, in the liquid crystal display device according to the present invention a conductive sheet CT2 may be pasted to the upper frame UFR in such a location as to make contact with the conductive rubber, in order to ensure conductive connection between the upper frame made of a metal and the conductive rubber. FIG. 8 is a cross sectional diagram showing part of a liquid crystal display device using an upper frame UFR to which a conductive sheet CT2 is pasted.

Particularly in the case where the upper frame is formed of aluminum, the surface of the upper frame may be oxidized, and thus the electrical contact with the conductive rubber lost. In such a case, it is possible to provide a conductive sheet CT2, so that stable conduction can be maintained. As shown in FIG. 8, the conductive sheet CT2 makes direct contact with the upper frame and the conductive rubber, and thus the upper frame is electrically connected to the conductive rubber without fail.

In addition, in the liquid crystal display device according to the present invention, the conductive sheet CT1 is thinner than the conductive rubber CG, and therefore, when the conductive sheet CT1 is pasted to the side of the mold frame MFR or the side of the lower frame SFR, as shown in FIGS. 6 and 8, it is not necessary to change the width of the upper frame UFR from in the prior art, and reduction of the width of the frame of the liquid crystal display device is not prevented.

The present invention can provide a liquid crystal display device where the conductive film provided on the display side of the liquid crystal display panel can be grounded without fail while making the frame narrower.

What is claimed is:

1. A liquid crystal display device, comprising: a liquid crystal display panel where a liquid crystal layer is provided between two facing substrates; a mold frame for holding said liquid crystal display panel in a predetermined position; a lower frame made of a metal for containing said mold frame; and first and second conductive members, characterized in that a conductive film is formed on a display side of said liquid crystal display panel, said first conductive member is a conductive rubber and provided so as to make contact with said conductive film and an upper surface of said mold frame;

said second conductive member is a tape made of a metal and provided so as to make direct contact with said first conductive member and said lower frame;

said first conductive member overlaps with said liquid crystal display panel in plan view; and said second conductive member which makes direct contact with said lower frame does not overlap with said liquid crystal display panel in plan view.

2. The liquid crystal display device according to claim 1, characterized by further comprising an upper frame made of a metal for covering an area around said liquid crystal display panel while exposing a display portion, characterized in that said upper frame makes contact with said first conductive member.

3. The liquid crystal display device according to claim 2, characterized in that said first conductive member has a first surface that makes contact with said second conductive member and a second surface on the side opposite to said first surface, and said second surface makes contact with said upper frame.

4. The liquid crystal display device according to claim 2, characterized in that said first conductive member has a first surface that makes contact with said second conductive member and a second surface on the side opposite to said first surface, and said second surface makes contact with said upper frame through a third conductive member.

5. The liquid crystal display device according to claim 2, characterized in that said upper frame is formed of a metal of which the main component is aluminum.

6. The liquid crystal display device according to claim 1, characterized in that said second conductive member is thinner than said first conductive member.

7. The liquid crystal display device according to claim 1, characterized in that said first conductive member makes contact with said second conductive member on said upper surface of said mold frame.

8. The liquid crystal display device according to claim 7, characterized in that said first conductive member is in physical contact with said second conductive member only on said upper surface of said mold frame.

* * * * *